(12) United States Patent
Kumano et al.

(10) Patent No.: US 10,635,911 B2
(45) Date of Patent: Apr. 28, 2020

(54) APPARATUS AND METHOD FOR RECOGNIZING TRAVEL LANE

(71) Applicants: SOKEN, INC., Nishio, Aichi-pref. (JP); DENSO CORPORATION, Kariya, Aichi-pref. (JP)

(72) Inventors: Shunya Kumano, Nishio (JP); Naoki Nitanda, Kariya (JP); Akihiro Watanabe, Kariya (JP)

(73) Assignees: DENSO CORPORATION, Kariya, Aichi-pref (JP); SOKEN, INC., Nishio, Aichi-pref (JP)

( * ) Notice: Subject to any disclaimer, the term of this patent is extended or adjusted under 35 U.S.C. 154(b) by 159 days.

(21) Appl. No.: 15/871,769

(22) Filed: Jan. 15, 2018

(65) Prior Publication Data
US 2018/0204075 A1 Jul. 19, 2018

(30) Foreign Application Priority Data
Jan. 16, 2017 (JP) .................. 2017-005347

(51) Int. Cl.
*G06K 9/00* (2006.01)
*B60W 40/072* (2012.01)
(Continued)

(52) U.S. Cl.
CPC ......... *G06K 9/00798* (2013.01); *B60W 30/12* (2013.01); *B60W 40/072* (2013.01);
(Continued)

(58) Field of Classification Search
CPC ............ G06K 9/00798; G06T 7/12; G06T 2207/30256; B60W 30/12; B60W 40/072; B60W 2550/146; G08G 1/167
See application file for complete search history.

(56) References Cited

U.S. PATENT DOCUMENTS

| | | |
|---|---|---|
| 6,577,334 B1 | 6/2003 | Kawai et al. |
| 2002/0080019 A1 | 6/2002 | Satoh et al. |

(Continued)

FOREIGN PATENT DOCUMENTS

| | | |
|---|---|---|
| JP | H11-232467 A | 8/1999 |
| JP | 2000-074199 A | 3/2000 |

(Continued)

*Primary Examiner* — Leon Viet Q Nguyen
(74) *Attorney, Agent, or Firm* — Knobbe, Martens, Olson & Bear, LLP (57) ABSTRACT

In an apparatus for recognizing a travel lane of a vehicle, a deviation determiner is configured to, if two or more shape change points are extracted by a shape change point extractor and the second derivative value of curvature of an extracted boundary line at at least one of the two or more shape change points is inverted in sign, determine whether or not the extracted boundary line and an estimated boundary line estimated from travel lane parameters estimated by a travel lane parameter estimator are deviating from each other beyond a predetermined allowable range. A driving aid is configured to, if it is determined that the extracted boundary line and the estimated boundary line are deviating from each other beyond the predetermined allowable range, perform control upon deviation to prevent occurrence of undesirable situations that may be caused by deviation between the extracted boundary line and the estimated boundary line.

18 Claims, 6 Drawing Sheets

(51) Int. Cl.
    *G06T 7/12*     (2017.01)
    *B60W 30/12*     (2020.01)
    *G08G 1/16*     (2006.01)

(52) U.S. Cl.
    CPC ............... *G06T 7/12* (2017.01); *G08G 1/167* (2013.01); *B60W 2550/146* (2013.01); *G06T 2207/30256* (2013.01)

(56) References Cited

U.S. PATENT DOCUMENTS

| | | |
|---|---|---|
| 2005/0209748 A1 | 9/2005 | Watanabe et al. |
| 2005/0270374 A1 | 12/2005 | Nishida et al. |
| 2006/0106518 A1* | 5/2006 | Stam ............... B60Q 1/1423 701/49 |
| 2012/0185167 A1 | 7/2012 | Higuchi et al. |
| 2012/0189221 A1 | 7/2012 | Inada et al. |
| 2015/0235095 A1 | 8/2015 | Kawasaki et al. |
| 2015/0248763 A1 | 9/2015 | Kumano et al. |
| 2015/0285614 A1 | 10/2015 | Okada et al. |
| 2015/0348275 A1 | 12/2015 | Kumano et al. |
| 2016/0003628 A1 | 1/2016 | Osanai et al. |
| 2016/0012298 A1 | 1/2016 | Maeda et al. |
| 2016/0012299 A1 | 1/2016 | Maeda et al. |

FOREIGN PATENT DOCUMENTS

| | | |
|---|---|---|
| JP | 2000-105898 A | 4/2000 |
| JP | 2002-197470 A | 7/2002 |
| JP | 2002-312797 A | 10/2002 |
| JP | 2005-258846 A | 9/2005 |
| JP | 2005-346383 A | 12/2005 |
| JP | 2007-164636 A | 6/2007 |
| JP | 2007-196851 A | 8/2007 |
| JP | 2011-028653 A | 2/2011 |
| JP | 2011-028659 A | 2/2011 |
| JP | 2011-043907 A | 3/2011 |
| JP | 2011-198110 A | 10/2011 |
| JP | 2012-022574 A | 2/2012 |
| JP | 2013-097738 A | 5/2013 |
| JP | 2014-127026 A | 7/2014 |
| JP | 2014-157429 A | 8/2014 |
| JP | 2015-079446 A | 4/2015 |
| JP | 2015-153161 A | 8/2015 |
| JP | 2015-166903 A | 9/2015 |
| JP | 2015-199423 A | 11/2015 |
| JP | 2016-018256 A | 2/2016 |
| JP | 2016-018520 A | 2/2016 |
| JP | 2016-018521 A | 2/2016 |

* cited by examiner

APPARATUS AND METHOD FOR RECOGNIZING TRAVEL LANE

CROSS-REFERENCE TO RELATED APPLICATION

This application is based on and claims the benefit of priority from earlier Japanese Patent Application No. 2017-5347 filed Jan. 16, 2017, the descriptions of which are incorporated herein by reference.

BACKGROUND

Technical Field

This disclosure relates to techniques for recognizing boundaries of a travel lane that an own vehicle is traveling in from an image captured by a vehicle-mounted camera.

Related Art

A technique disclosed in Japanese Patent Application Laid-Open Publication No. 2011-198110 is configured to detect edges of lane lines of a travel lane from an image captured by a vehicle-mounted camera looking forward, and using a Kalman filter, estimate travel lane parameters, such as a curvature, a yaw angle, and a pitch angle.

A filter with high responsivity used for estimation of such travel lane parameters is liable to pick up noise, which may lead to unstable estimation of the travel lane parameters. Therefore, the responsivity of the filter is set low enough to prevent unstable estimation of the travel lane parameters. However, with such low responsibility of the filter, estimation of the travel lane parameters may fail to follow changes in shape of a crooked lane or the like having alternatingly reversal curves appearing at short intervals, such as a right turn lane (in the case of the left-hand traffic), which may lead to reduced accuracy of estimating the travel lane parameters. Thus, the accuracy of various controls using the travel lane parameters may be decreased.

In view of the above, techniques are desired for preventing undesirable situations caused by reduction in the accuracy of estimating a shape of a travel lane with a complex shape.

SUMMARY

In accordance with an exemplary embodiment of the present disclosure, there is provided an apparatus for recognizing a travel lane of a vehicle includes an image acquirer, an edge extractor, a travel lane parameter estimator, a shape change point extractor, a deviation determiner, and a driving aid.

The image acquirer is configured to acquire, from a camera mounted in the vehicle, an image of the travel lane ahead of the vehicle. The edge extractor is configured to extract boundary edge points used to estimate a boundary of the travel lane from the image acquired from the image acquirer. The travel lane parameter estimator is configured to use a filter prepared in advance to estimate travel lane parameters representing a condition and shape of the travel lane from coordinates of the boundary edge points extracted by the edge extractor. The shape change point extractor is configured to extract a shape change point at which an absolute value of a second derivative value of curvature of an extracted boundary line that is a boundary line represented by the boundary edge points extracted by the edge extractor exceeds a predetermined threshold. The deviation determiner is configured to, if two or more shape change points are extracted by the shape change point extractor and the second derivative value of curvature of the extracted boundary line at at least one of the two or more shape change points is inverted in sign, determine whether or not the extracted boundary line and an estimated boundary line that is a boundary line estimated from the travel lane parameters estimated by the travel lane parameter estimator are deviating from each other beyond a predetermined allowable range. The driving aid is configured to, if it is determined by the deviation determiner that the extracted boundary line and the estimated boundary line are deviating from each other beyond the predetermined allowable range, perform control upon deviation to prevent occurrence of undesirable situations that may be caused by deviation between the extracted boundary line and the estimated boundary line.

With this configuration, if two or more shape change points are extracted and the second derivative value of curvature of the extracted boundary line at at least one of the two or more shape change points is inverted in sign, the extracted boundary line and the estimated boundary line are likely to be deviating from each other. Therefore, it is determined whether or not the extracted boundary line and the estimated boundary line are actually deviating from each other. That is, assuming that the travel lane is crooked such that the extracted boundary line and the estimated boundary line are liable to deviate from each other, it is determined whether or not the extracted boundary line and the estimated boundary line are deviating from each other. If it is determined that the extracted boundary line and the estimated boundary line are deviating from each other, control upon deviation will be performed. This configuration can prevent occurrence of undesirable situations that may be caused by deviation between the extracted boundary line and the estimated boundary line associated with the same extracted boundary line, that is, decreased accuracy of estimating the boundary line.

DESCRIPTION OF SPECIFIC EMBODIMENTS

Hereinafter, exemplary embodiments of the present disclosure will be described in detail with reference to the accompanying drawings, in which like reference numerals refer to like or similar elements regardless of reference numerals and duplicated description thereof will be omitted.

1. System Configuration

Figure 1:
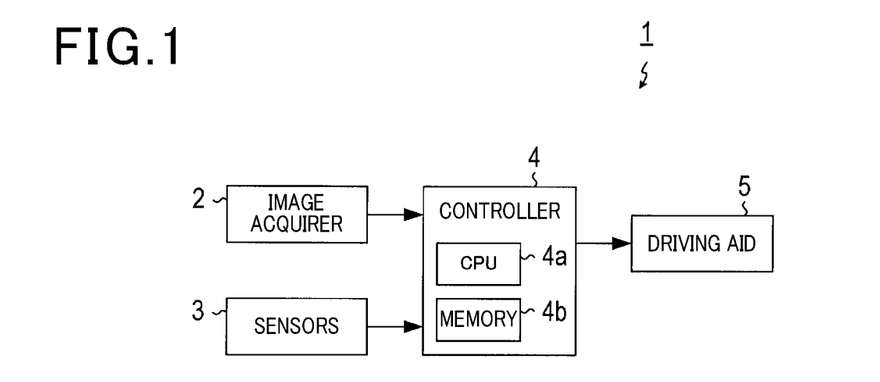
FIG. 1 is a block diagram of a driving aid system in accordance with one embodiment of the present disclosure.

A driving aid system 1 according to one embodiment of the present disclosure will be described with reference to FIG. 1. The driving aid system 1 is mounted in a vehicle and configured to detect stationary objects in front of the vehicle, estimate a shape of a travel lane based on the detected stationary objects, and provide various driving aids based on the estimated shape of the travel lane. In the following description, the vehicle carrying the driving aid system 1 will be referred to as an own vehicle. The stationary objects include, but are not limited to, lane lines or markings painted on a roadway surface, and guardrails.

The driving aid system 1 includes an imager 2, sensors 3, a controller 4, and a driving aid 5.

Figure 2:
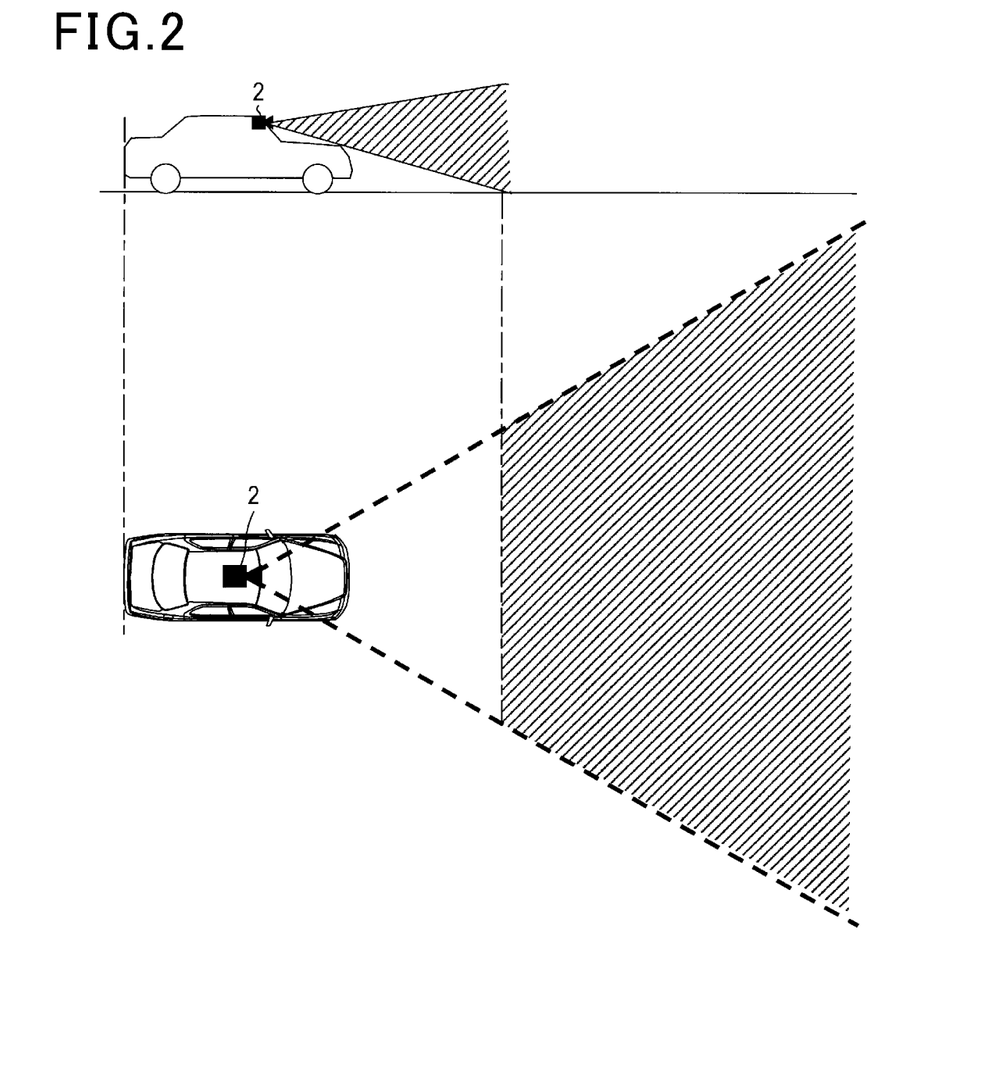
FIG. 2 is an illustration of an imaging field of an imager.

The imager 2 may include a charge-coupled device (CCD) camera, a complementary metal-oxide semiconductor (CMOS) image sensor, a near-infrared camera or the like to capture images of a travel lane ahead of the own vehicle. More specifically, as shown in FIG. 2, the imager 2 is installed in the front center of the own vehicle to capture images of a front area that horizontally spans a pre-defined range of angles to an imaging axis.

The sensors 3 are mounted in the own vehicle to detect conditions and behaviors of the own vehicle. More specifically, the sensors 3 include at least a vehicle speed sensor configured to detect a vehicle speed of the own vehicle based on a rotational speed of the vehicle wheels. The sensors 3 may further include a yaw rate sensor configured to detect an angular turning speed of the own vehicle, a GPS sensor configured to detect a location of the own vehicle, and a radar sensor configured to detect a distance and a relative speed between the own vehicle and a target existing around the own vehicle.

The controller 4 may be formed of one or more microcomputers, each incorporating therein a central processing unit (CPU) 4a and a memory 4b that is a non-transitory computer readable storage medium (e.g., random access memory (RAM), read only memory (ROM), and flash, etc.). Various functions of the controller 4 may be implemented by the CPU 4a executing programs stored in the memory 4b, thereby performing methods corresponding to the programs.

The driving aid 5 is configured to actuate various controlled objects based on results of recognition by the controller 4 for a shape of the travel lane and results of detection by the controller 4 for various targets and thereby perform driving aid control, such as lane keeping assist. The controlled objects may include actuators for actuating a brake, a steering system, a seat belt and others, and an alarm device.

2. Processing

The functions of the controller 4 implemented by the CPU 4a executing programs stored in the memory 4b include a target detection function and a travel lane recognition function. The target detection function is a function to detect various targets based on images acquired from the imager 2 and information acquired from the sensors 3. Such a target detection function is well known and will therefore not be described in detail.

Figure 3:
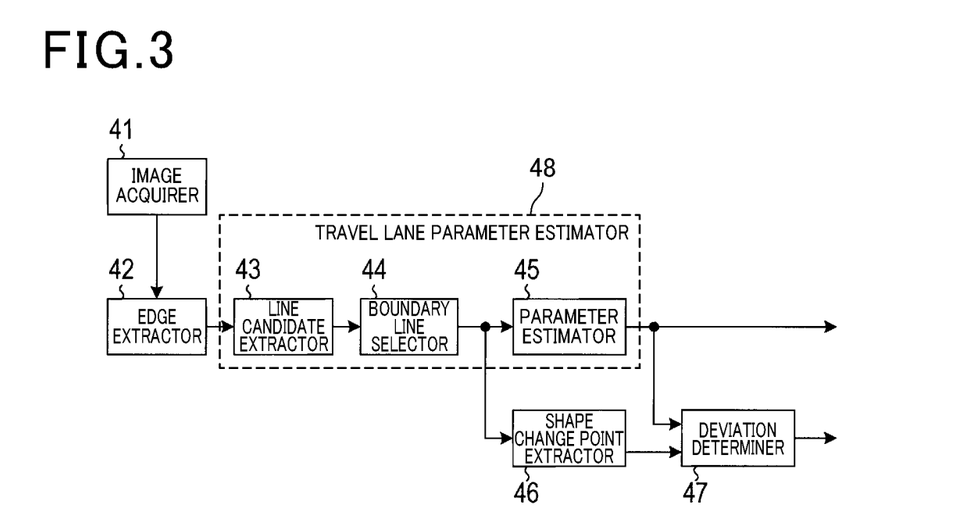
FIG. 3 is a functional block diagram for a parameter estimation function implemented by a controller.

To implement the travel lane recognition function, the controller 4 includes, as functional blocks shown in FIG. 3, an image acquirer 41, an edge extractor 42, a line candidate extractor 43, a boundary line selector 44, a parameter estimator 45, a shape change point extractor 46, and a deviation determiner 47. The line candidate extractor 43, the boundary line selector 44, and the parameter estimator 45 forms a travel lane parameter estimator 48.

These functional blocks may be implemented by software only, hardware only, or a combination thereof. For example, when these functions are provided by an electronic circuit which is hardware, the electronic circuit can be provided by a digital circuit including a number of logic circuits, an analog circuit, or a combination thereof.

The image acquirer 41 is configured to acquire an image from the imager 2 every predetermined time interval.

The edge extractor 42 is configured to apply a sobel filter or the like to the image acquired from the image acquirer 41 to extract edge points, each of which may be a pixel where a difference in brightness between the pixel and its adjacent pixel is above a predetermined threshold.

The line candidate extractor 43 is configured to Hough-transform the edge points extracted by the edge extractor 42 to extract one or more boundary line candidates for each boundary of the travel lane.

The boundary line selector 44 selects, from the boundary line candidates extracted by the line candidate extractor 43, a pair of boundary line candidates that can be assumed to represent left and right boundaries of the travel lane of the own vehicle.

The parameter estimator 45 is configured to use a Kalman filter to calculate travel lane parameters representing a condition and shape of the travel lane for the own vehicle, where coordinates of boundary edge points that are edge points constituting left and right boundary lines of the travel lane selected by the boundary line selector 44 are observations. The parameter estimator 45 is configured to output the calculated travel lane parameters to both the deviation determiner 47 and the driving aid 5.

Among the travel lane parameters, parameters representing a condition of the travel lane for the own vehicle may include an offset yc, a lane slope $\varphi$, and a pitching amount $\beta$. Among the travel lane parameters, parameters representing a shape of the travel lane for the own vehicle may include a curvature $\rho$ and a lane width WI. The offset yc is a distance between a center line of the imager 2 extending in the travel direction and a lateral (or lane width wise) center of the travel lane. The offset yc represents a lateral (or lane width wise) displacement of the own vehicle. When the own vehicle is traveling in the center of the travel lane, the offset yc is zero. The lane slope $\varphi$ is a slope of a tangent line to a virtual center line between the left and right boundary lines from the travel direction of the own vehicle. The lane slope $\varphi$ represents a yaw angle of the own vehicle. The pitching amount $\beta$ represents a pitch angle of the own vehicle with respect to the travel lane. The curvature $\rho$ is a curvature of the virtual center line between the left and right boundary lines. The lane width WI is a spacing between the left and right boundary lines of the travel lane in a direction perpendicular to a longitudinal center line of the own vehicle. The lane width WI represents a width of the travel lane.

Estimation of the travel lane parameters using the Kalman filter may use a technique disclosed in Japanese Patent Application Laid-Open Publication No. 2015-199423 and will therefore not be described in detail.

Figure 4:
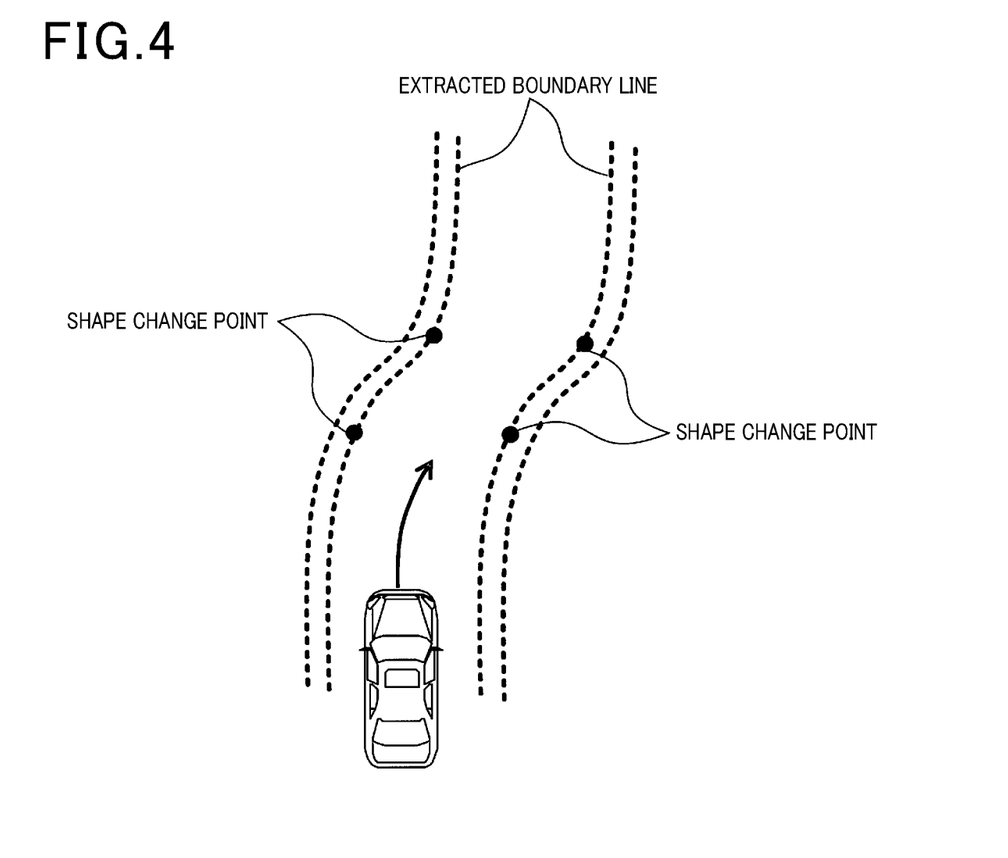
FIG. 4 is an illustration of shape change points.
Figure 7:
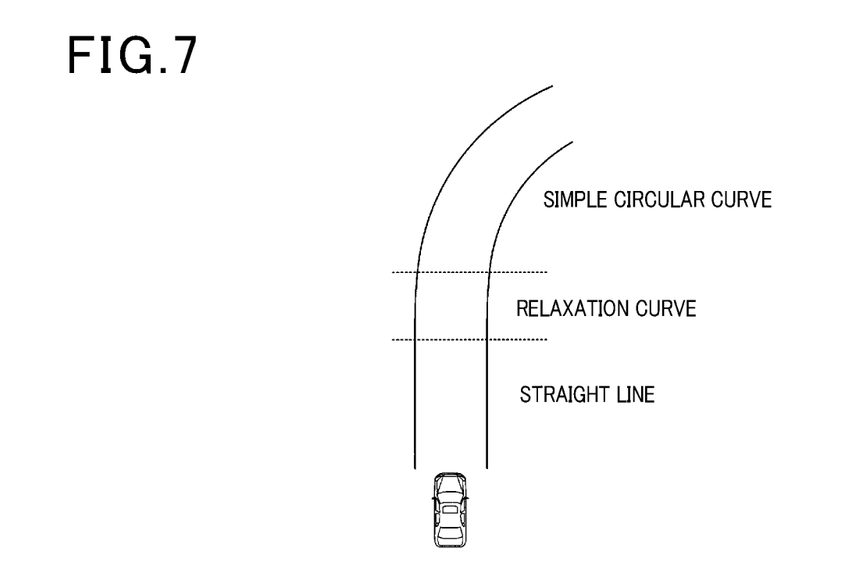
FIG. 7 is an illustration of curves forming a roadway.
Figure 8:
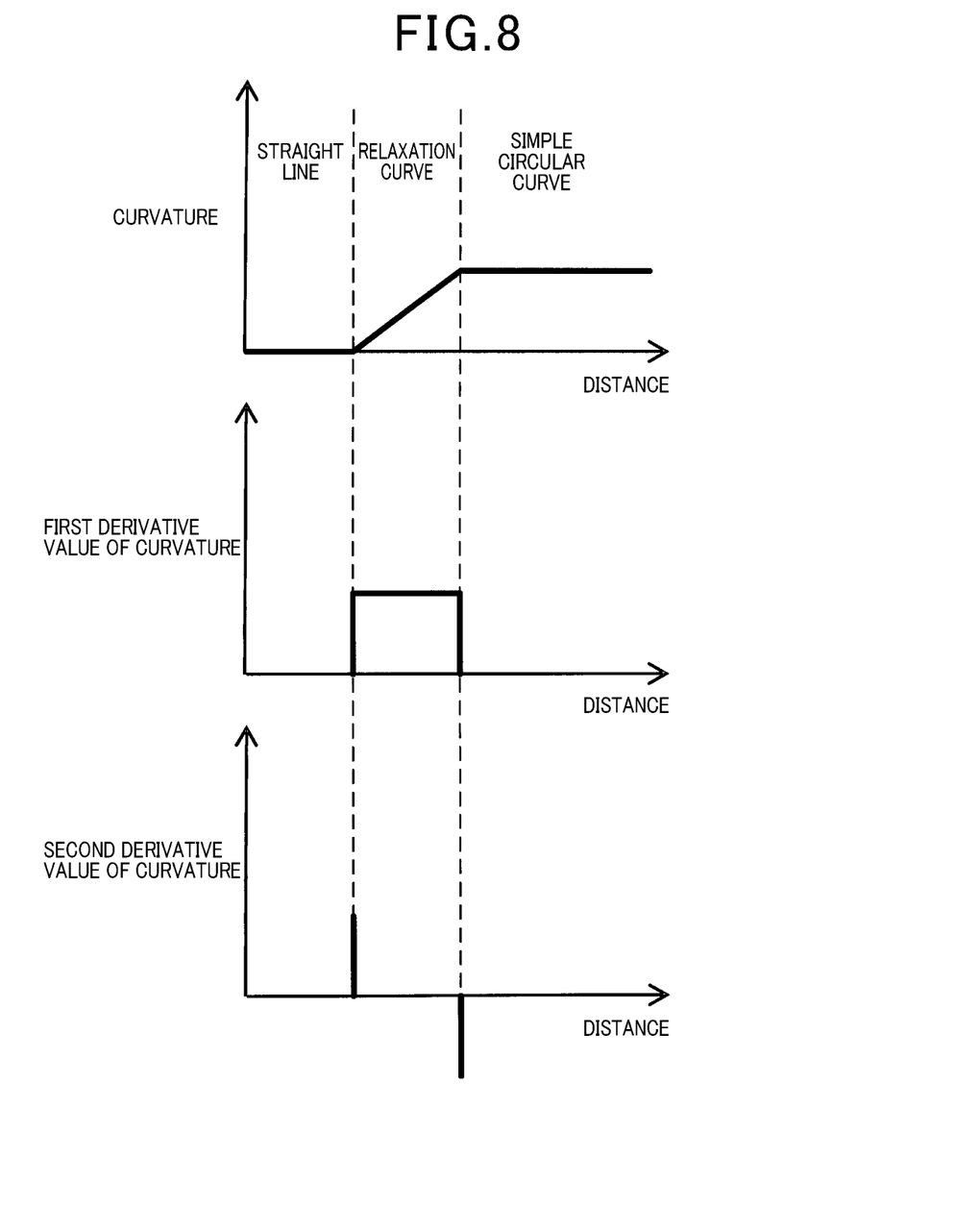
FIG. 8 shows exemplary graphs illustrating first derivative values of curvature and second derivative values of curvature.

As shown in FIG. 4, each boundary line connecting boundary edge points is referred to as an extracted boundary line. The shape change point extractor 46 is configured to extract a shape change point at which an absolute value of a second derivative value of the curvature of the extracted boundary line becomes equal to or greater than a predetermined threshold and calculate coordinates of the shape change point. When there is a plurality of such shape change points, the shape change point extractor 46 extracts all of them and acquires the number of the extracted shape change points. More specifically as shown in FIGS. 7 and 8, each shape change point is detected at a point where a straight line transitions to a relaxation curve or vice versa, or at a point where a relaxation curve transitions to a simple circular curve or vice versa. The relaxation curve is a curve along which the curvature gradually decreases or increases and the simple circular curve is a curve with a constant curvature.

Figure 9:
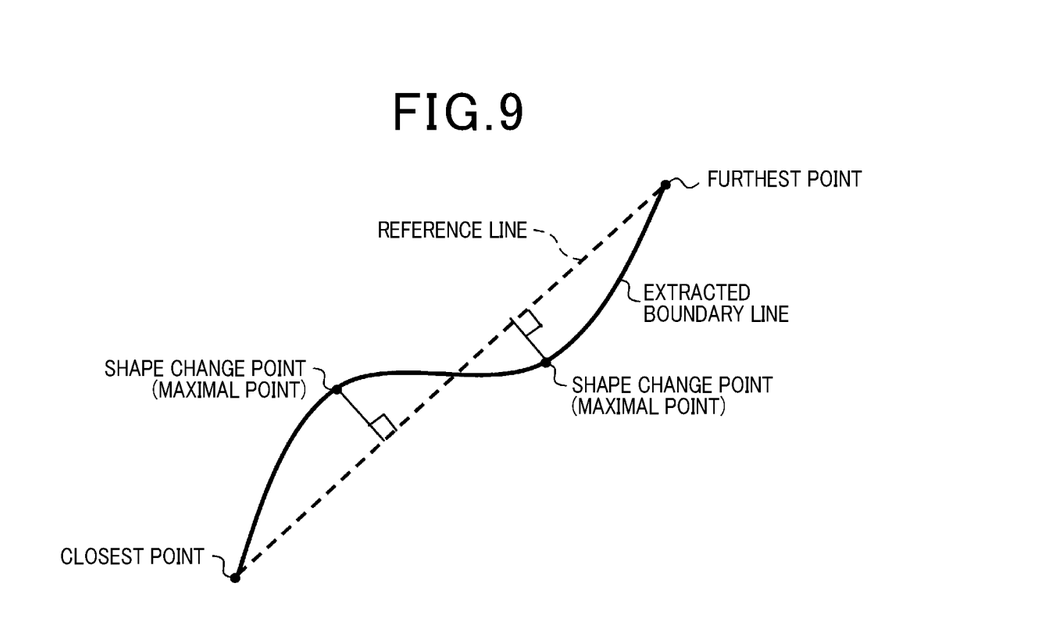
FIG. 9 is an illustration of relationship between an extracted boundary line, a reference line, and maximal points.

The shape change point extractor 46 is configured to extract a shape change point in a simple manner. More specifically, as shown in FIG. 9, the shape change point extractor 46 extracts a point along an extracted boundary line such that a distance from the point to a reference line for the extracted boundary line becomes maximal, as a shape change point. The reference line for the extracted boundary line is a straight line connecting a point closest to the own vehicle along the extracted boundary line and a point furthest away from the own vehicle along the same extracted boundary line.

A boundary line calculated from the travel lane parameters estimated by the parameter estimator 45 is referred to as an estimated boundary line. The deviation determiner 47 is configured to determine whether or not the estimated boundary line and the extracted boundary line are deviating from each other and output a determination result to the driving aid 5.

3. Deviation Determination Processing

Figure 5:
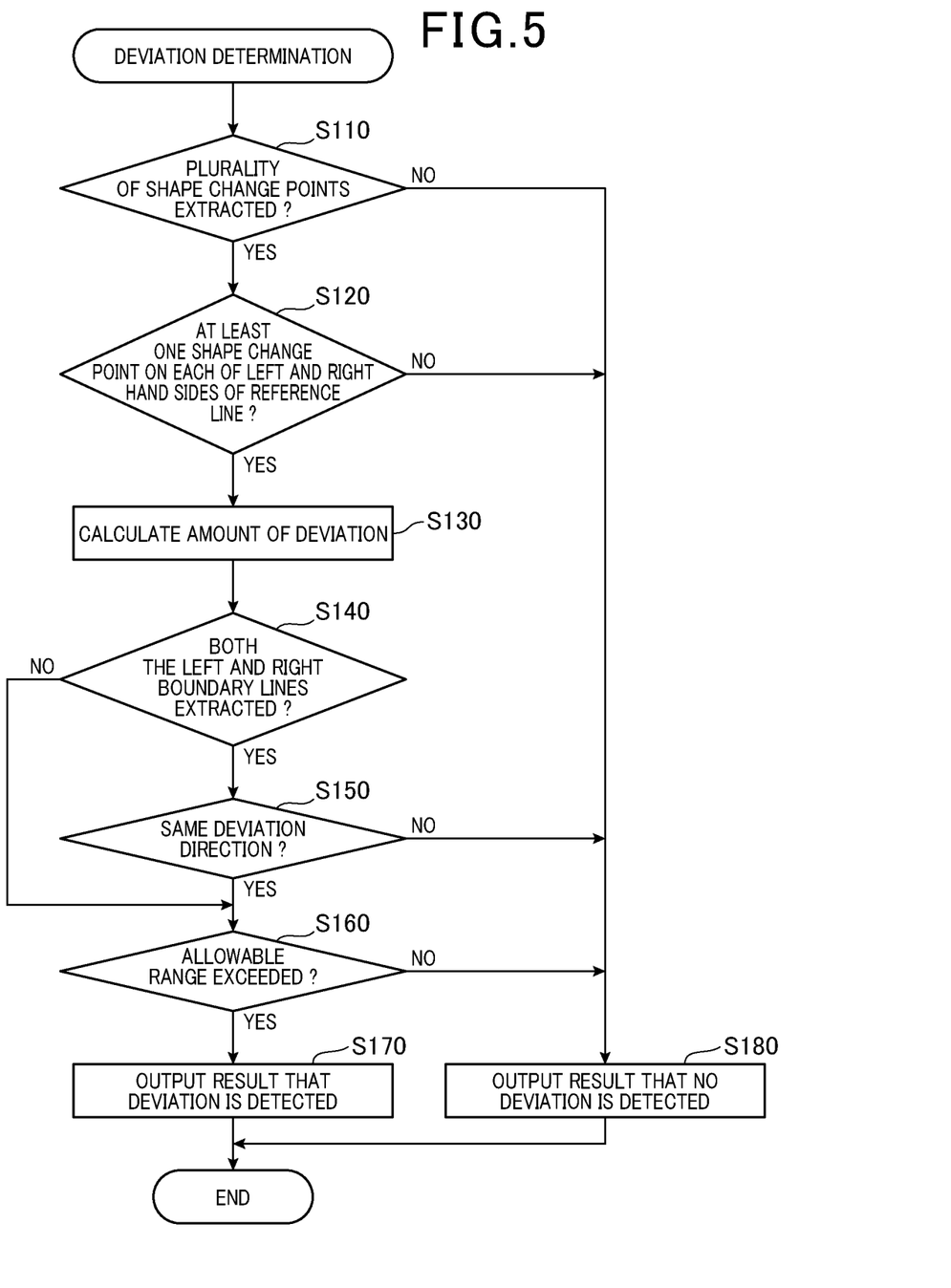
FIG. 5 is a flowchart of deviation determination processing performed by the a deviation determiner.

Deviation determination processing to be performed in the deviation determiner 47 will now be described with reference to a flowchart of FIG. 5. This deviation determination processing is performed each time the travel lane parameters are estimated by the parameter estimator 45 and the shape change points are extracted by the shape change point extractor 46 from the same image.

Upon initiation of deviation determination processing, at step S110, the deviation determiner 47 determines whether or not there are a plurality of shape change points extracted from either one of the left and right extracted boundary lines by the shape change point extractor 46. If it is determined that there are a plurality of shape change points extracted from either one of the left and right extracted boundary lines by the shape change point extractor 46, then the process flow proceeds to step S120. In cases where there is only one of the left and right extracted boundary lines, the deviation determiner 47 determines whether or not there are a plurality of shape change points extracted from the one of the left and right extracted boundary lines.

At step S120, the deviation determiner 47 determines whether or not there is at least one shape change point extracted by the shape change point extractor 46 on each of the left and right hand sides of the reference line. If it is determined that there is at least one shape change point on each of the left and right hand sides of the reference line, then the process flow proceeds to step S130.

Figure 6:
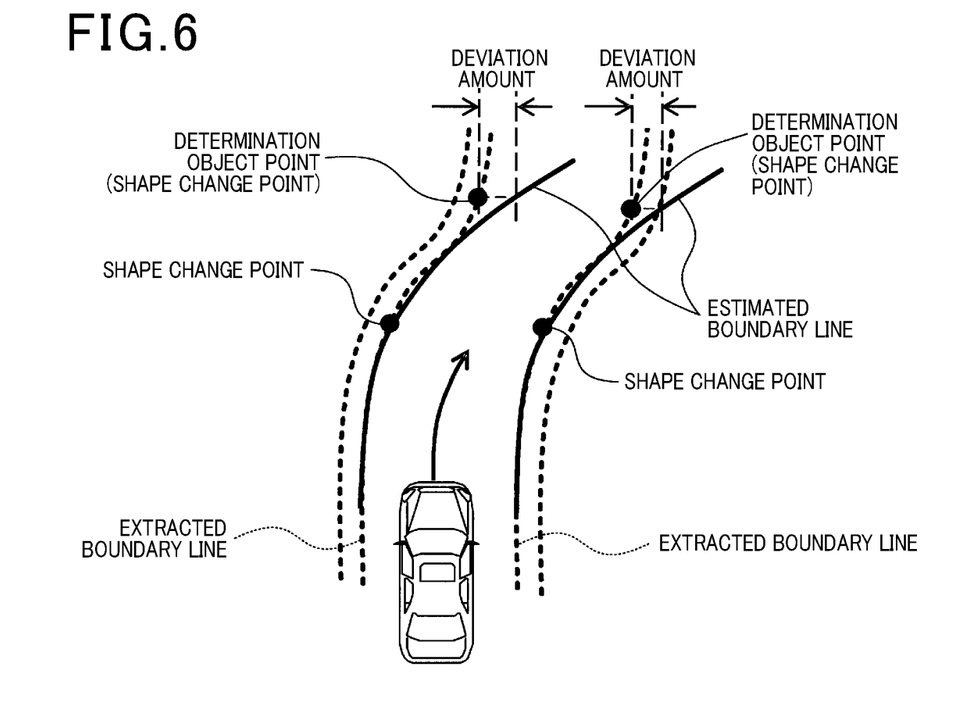
FIG. 6 is an illustration of calculating amounts of deviation.

At step S130, the deviation determiner 47 calculates, for each of the left and right extracted boundary lines, an amount of deviation between the extracted boundary line and the estimated boundary line associated with the same extracted boundary line. Thereafter, the process flow proceeds to step S140. More specifically, as shown in FIG. 6, as viewed from the own vehicle, the closest shape change point that changes sides with respect to the reference line is a determination object point. That is, the closest shape change point at which the second derivative value of curvature of the extracted boundary line is inverted in sign is a determination object point. The amount of deviation between the extracted boundary line and the estimated boundary line associated with the same extracted boundary line is a distance between the determination object point along the extracted boundary line and the estimated boundary line associated with the same extracted boundary line in the lateral or vehicle width wise direction. For illustrative purposes, in the present embodiment, if the determination object point along the extracted boundary line is present on the left hand side of the estimated boundary line associated with the same extracted boundary line, the amount of the deviation may be a positive value. If the determination object point along the extracted boundary line is present on the right hand side of the estimated boundary line associated with the same extracted boundary line, the amount of the deviation may be a negative value. In cases where there is only either a left or right extracted boundary line, the deviation determiner 47 calculates an amount of deviation for the left or right extracted boundary lines.

At step S140, the deviation determiner 47 determines whether or not both the left and right extracted boundary lines have been extracted. If it is determined that both the left and right extracted boundary lines have been extracted, then the process flow proceeds to step S150. If it is determined that only either one of the left and right extracted boundary lines has been extracted, then the process flow proceeds to step S160.

At step S150, the deviation determiner 47 determines whether or not a deviation direction of the left estimated boundary line from the left extracted boundary line and a deviation direction of the right estimated boundary line from the right extracted boundary line are the same direction. If it is determined that the deviation direction of the left estimated boundary line from the left extracted boundary line and the deviation direction of the right estimated boundary line from the right extracted boundary line are the same direction, the process flow proceeds to step S160. More specifically, if both the deviation amount of the left estimated boundary line from the left extracted boundary line and the deviation amount of the right estimated boundary line from the right extracted boundary line have the same sign, it is determined that deviation directions of the left and right estimated boundary lines are the same direction.

At step S160, the deviation determiner 47 determines whether an allowable range is exceeded. If it is determined that the allowable range is exceeded, then the process flow proceeds to step S170. More specifically, if the absolute value of the amount of deviation has exceeded a predetermined deviation threshold, then it is determined that the allowable range is exceeded. In cases where the amount of deviation has been calculated for each of the left and right extracted boundary lines, it may be determined that the allowable range is exceeded if at least one of the absolute value of the amount of deviation for the left extracted boundary line and the absolute value of the amount of deviation for the right extracted boundary line has exceeded the predetermined deviation threshold. Alternatively, it may be determined that the allowable range is exceeded if both the absolute value of the amount of deviation for the left extracted boundary line and the absolute value of the amount of deviation for the right extracted boundary line have exceeded the predetermined deviation threshold. The deviation threshold is not limited to a fixed value. For example, the deviation threshold may be variably set as a function of a distance from the own vehicle to the shape change point used to calculated the amount of deviation such that the deviation threshold increases with increasing distance from the own vehicle to the same shape change point.

At step S170, the deviation determiner 47 outputs a determination result that deviation has been detected to the driving aid 5. Thereafter, the process flow ends.

If the answer is "NO" in step S110, S120, S140, S150, or S160, then the process flow proceeds to step S180.

At step S180, the deviation determiner 47 outputs a determination result that no deviation has been detected to the driving aid 5. Then, the process flow ends.

In response to the determination result that deviation has been detected, the driving aid 5 performs control upon deviation to avoid or suppress disadvantages caused by deviation. More specifically, the control upon deviation may include notification control to notify the driver that the accuracy of estimating the travel lane parameters has been decreased and functionality suspension control to suspend some or all control functions using the travel lane parameters, such as inhibiting application of the travel lane parameters estimated beyond the determination object points.

4. Advantages

The present embodiment configured as above can provide the following advantages.

(4a) In the driving aid system 1, if two or more shape change points along an extracted boundary line are extracted, and if the extracted boundary line transversally intersects a reference line connecting a closest point and a furthest point along the extracted boundary line as viewed from the own vehicle, it is determined whether or not the extracted boundary line and the estimated boundary line are is deviating from each other. If it is determined that the extracted boundary line and the estimated boundary line are is deviating from each other, notification control and/or functionality suspension control are performed as control upon deviation. This configuration can prevent occurrence of undesirable situations that may be caused by deviation between the extracted boundary line and the estimated boundary line associated with the same extracted boundary line, that is, decreased accuracy of estimating the boundary line. The undesirable situations may include a situation that, when the own vehicle traveling on a crooked roadway has to turn left immediately after turning right, the driving aid system 1 may determine that the vehicle will deviate from the estimated boundary line and thus perform driving aid operation to prevent the own vehicle from turning left.

5. Modifications

A specific embodiment of the present disclosure has so far been described. However, the present disclosure should not be construed as being limited to the foregoing embodiment, but may be modified in various modes.

(5a) In the embodiment set forth above, the result of determination made in the deviation determiner 47 is outputted to the driving aid 5. Alternatively, the result of determination made in the deviation determiner 47 may be fed to the parameter estimator 45. If the result of determination made in the deviation determiner 47 indicates that deviation has been detected, the parameter estimator 45 may estimate the travel lane parameters separately for before and after the determination object point. That is, the travel parameters are separately estimated in each segment between the j-th closest sign-inverted shape change point and the (j+1)-th closest sign-inverted shape change point along the extracted boundary line, where j is a positive integer value, the j-th closest sign-inverted shape change point is, as viewed from the vehicle, the j-th closest shape change point at which the second derivative value of curvature of the extracted boundary line is inverted in sign. This configuration can increase accuracy of estimating the travel lane parameters further away from the determination object point.

(5b) In the embodiment set forth above, the Kalman filter is used to estimate the travel lane parameters. Alternatively, any other filter used to estimate a state space model, such as H∞ filter, may be used to estimate the travel lane parameters.

(5c) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(5d) The present disclosure is not limited to the above-described apparatus for recognizing a travel lane corresponding to the controller 4 configured to implement the travel lane recognition function. The present disclosure may be implemented in various forms, such as a system including the apparatus for recognizing a travel lane, programs enabling a computer to serve as the apparatus for recognizing a travel lane, a non-transitory computer readable storage medium storing these programs, and a method for recognizing a travel lane.

What is claimed is:

1. An apparatus for recognizing a travel lane of a vehicle, comprising:
    an image acquirer configured to acquire, from a camera mounted in the vehicle, an image of the travel lane ahead of the vehicle;
    an edge extractor configured to extract boundary edge points used to estimate a boundary of the travel lane from the image acquired from the image acquirer;
    a travel lane parameter estimator configured to use a filter prepared in advance to estimate travel lane parameters representing a condition and shape of the travel lane from coordinates of the boundary edge points extracted by the edge extractor;
    a shape change point extractor configured to extract a shape change point at which an absolute value of a second derivative value of curvature of an extracted boundary line that is a boundary line represented by the boundary edge points extracted by the edge extractor exceeds a predetermined threshold;
    a deviation determiner configured to, if two or more shape change points are extracted by the shape change point extractor and the second derivative value of curvature of the extracted boundary line at at least one of the two or more shape change points is inverted in sign, determine whether or not the extracted boundary line and an estimated boundary line that is a boundary line estimated from the travel lane parameters estimated by the travel lane parameter estimator are deviating from each other beyond a predetermined allowable range; and
    a driving aid configured to, if it is determined by the deviation determiner that the extracted boundary line and the estimated boundary line are deviating from each other beyond the predetermined allowable range, perform specific control of the vehicle to prevent occurrence of undesirable situations caused by deviation between the extracted boundary line and the estimated boundary line.

2. The apparatus according to claim 1, wherein the driving aid is configured to, as the specific control, prohibit the estimated boundary line from being used further away from the vehicle than a sign-inverted shape change point that is, as viewed from the vehicle, a closest shape change point at which the second derivative value of curvature of the extracted boundary line is inverted in sign.

3. The apparatus according to claim 1, wherein the driving aid is configured to, as the specific control, cause the travel lane parameter estimator to estimate the travel parameters in each segment between the j-th closest sign-inverted shape change point and the (j+1)-th closest sign-inverted shape change point along the extracted boundary line, j being a positive integer value, the j-th closest sign-inverted shape change point being, as viewed from the vehicle, the j-th closest shape change point at which the second derivative value of curvature of the extracted boundary line is inverted in sign.

4. The apparatus according to claim 2, wherein:
the closest shape change point at which the second derivative value of curvature of the extracted boundary line is inverted in sign is a determination object point; and
the deviation determiner is configured to, if a distance between the determination object point along the extracted boundary line and the estimated boundary line in a lane width-wise direction exceeds a predetermined deviation threshold, determine that the extracted boundary line and the estimated boundary line are deviating from each other beyond the predetermined allowable range.

5. The apparatus according to claim 4, wherein the deviation threshold increases with increasing distance from the vehicle to the determination object point.

6. The apparatus according to claim 1, wherein, when both the extracted boundary line and the estimated boundary line are acquired for each of left and right boundaries of the travel lane, the deviation determiner is configured to, if a deviation direction of the left estimated boundary line from the left extracted boundary line and a deviation direction of the right estimated boundary line from the right extracted boundary line are the same direction, determine that the extracted boundary line and the estimated boundary line are deviating from each other beyond the predetermined allowable range.

7. The apparatus according to claim 1, wherein;
a straight line connecting a point closest to the vehicle along the extracted boundary line and a point furthest away from the vehicle along the same extracted boundary line is a reference line for the extracted boundary line; and
the shape change point extractor is configured to extract a maximal point along the extracted boundary line such that a distance from the maximal point to the reference line for the extracted boundary line becomes maximal, as the shape change point.

8. The apparatus according to claim 1, wherein the filter used by the travel lane parameter estimator is a Kalman filter.

9. A method of recognizing a travel lane of a vehicle, comprising:
acquiring from a camera mounted in the vehicle an image of the travel lane;
extracting boundary edge points of the travel lane;
using a filter prepared in advance to estimate travel lane parameters representing a condition and shape of the travel lane from coordinates of the boundary edge points;
extracting a shape change point at which an absolute value of a second derivative value of curvature of an extracted boundary line represented by the boundary edge points extracted exceeds a predetermined threshold;
acquiring an estimated boundary line that is a boundary line estimated from the travel lane parameters;
determining whether or not the extracted boundary line and the estimated boundary line are deviating from each other beyond a predetermined allowable range, if two or more shape change points are extracted by the shape change point extractor and the second derivative value of curvature of the extracted boundary line at at least one of the two or more shape change points is inverted in sign; and
performing specific control of the vehicle to prevent occurrence of undesirable situations caused by deviation between the extracted boundary line and the estimated boundary line, if it is determined that the extracted boundary line and the estimated boundary line are deviating from each other beyond the predetermined allowable range.

10. The method according to claim 9, wherein performing the specific control includes, as the specific control, prohibiting the estimated boundary line from being used further away from the vehicle than a sign-inverted shape change point that is, as viewed from the vehicle, a closest shape change point at which the second derivative value of curvature of the extracted boundary line is inverted in sign.

11. The method according to claim 9, wherein performing the specific control includes, as the specific control, estimating the travel parameters in each segment between the j-th closest sign-inverted shape change point and the (j+1)-th closest sign-inverted shape change point along the extracted boundary line, j being a positive integer value, the j-th closest sign-inverted shape change point being, as viewed from the vehicle, the j-th closest shape change point at which the second derivative value of curvature of the extracted boundary line is inverted in sign.

12. The method according to claim 10, wherein:
the closest shape change point at which the second derivative value of curvature of the extracted boundary line is inverted in sign is a determination object point; and
determining whether or not the extracted boundary line and the estimated boundary line are deviating from each other includes, if a distance between the determination object point along the extracted boundary line and the estimated boundary line in a lane width-wise direction exceeds a predetermined deviation threshold, determining that the extracted boundary line and the estimated boundary line are deviating from each other beyond the predetermined allowable range.

13. The method according to claim 12, wherein the deviation threshold increases with increasing distance from the vehicle to the determination object point.

14. The method according to claim 9, wherein, when both the extracted boundary line and the estimated boundary line are acquired for each of left and right boundaries of the travel lane, determining whether or not the extracted boundary line and the estimated boundary line are deviating from each other includes, if a deviation direction of the left estimated boundary line from the left extracted boundary line and a deviation direction of the right estimated boundary line from the right extracted boundary line are the same direction, determining that the extracted boundary line and the estimated boundary line are deviating from each other beyond the predetermined allowable range.

15. The method according to claim 9, wherein:
a straight line connecting a point closest to the vehicle along the extracted boundary line and a point furthest away from the vehicle along the same extracted boundary line is a reference line for the extracted boundary line; and
extracting a shape change point includes extracting a maximal point along the extracted boundary line such that a distance from the maximal point to the reference line for the extracted boundary line becomes maximal, as the shape change point.

16. The method according to claim 9, wherein the filter is a Kalman filter.

17. The apparatus according to claim 1, wherein the specific control includes at least notification control to notify a driver of the vehicle that estimation accuracy of the travel lane parameters has been decreased or functionality suspension control to suspend some or all of control functions using the travel lane parameters.

18. The method according to claim 9, wherein the specific control includes at least notification control to notify a driver of the vehicle that estimation accuracy of the travel lane parameters has been decreased or functionality suspension control to suspend some or all of control functions using the travel lane parameters.

* * * * *